United States Patent
Aihara

(10) Patent No.: US 11,646,034 B2
(45) Date of Patent: May 9, 2023

(54) INFORMATION PROCESSING SYSTEM, INFORMATION PROCESSING APPARATUS, AND COMPUTER READABLE RECORDING MEDIUM

(71) Applicant: TOYOTA JIDOSHA KABUSHIKI KAISHA, Toyota (JP)

(72) Inventor: Satoshi Aihara, Shinjuku-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 17/144,202

(22) Filed: Jan. 8, 2021

(65) Prior Publication Data

US 2021/0233536 A1 Jul. 29, 2021

(30) Foreign Application Priority Data

Jan. 23, 2020 (JP) .............................. JP2020-009449

(51) Int. Cl.
*G10L 15/30* (2013.01)
*G10L 15/26* (2006.01)
(Continued)

(52) U.S. Cl.
CPC .............. *G10L 15/30* (2013.01); *G10L 15/10* (2013.01); *G10L 15/22* (2013.01); *G10L 15/26* (2013.01)

(58) Field of Classification Search
CPC ......... G10L 15/30; G10L 15/10; G10L 15/22; G10L 15/26
See application file for complete search history.

(56) References Cited

U.S. PATENT DOCUMENTS 8,838,454 B1 * 9/2014 Thenthiruperai ....... G10L 15/22
704/277
2016/0322048 A1 * 11/2016 Amano ................... G10L 15/22
(Continued)

FOREIGN PATENT DOCUMENTS

JP 2018-189984 A 11/2018

OTHER PUBLICATIONS

Lin et al. "A distributed Architecture for Cooperative Spoken Dialogue Agents with Coherent Dialogue State and History", (Year: 1999).*

*Primary Examiner* — Bhavesh M Mehta
*Assistant Examiner* — Darioush Agahi
(74) *Attorney, Agent, or Firm* — Oblon, McClelland, Maier & Neustadt, L.L.P.

(57) ABSTRACT

An information processing system includes: a first device configured to acquire a user's uttered voice, transfer the user's uttered voice to at least one of a second and a third devices each actualizing a voice interaction agent, when a control command is acquired, convert a control signal based on the acquired control command to a control signal that matches the second device, and transmit the converted control signal to the second device; a second device configured to recognize the uttered voice transferred from the first device, and output, to the first device, a control command regarding a recognition result obtained by recognizing the uttered voice and response data based on the control signal; and a third device configured to recognize the uttered voice transferred from the first device, and output, to the first device, a control command regarding a recognition result obtained by recognizing the uttered voice.

5 Claims, 3 Drawing Sheets

(51) Int. Cl.
G10L 15/10 (2006.01)
G10L 15/22 (2006.01)

(56) References Cited

U.S. PATENT DOCUMENTS

| | | | |
|---|---|---|---|
| 2018/0061223 A1* | 3/2018 | Shin | G05B 15/02 |
| 2018/0096675 A1* | 4/2018 | Nygaard | G10L 13/04 |
| 2018/0204569 A1* | 7/2018 | Nadkar | G10L 15/22 |
| 2019/0013019 A1* | 1/2019 | Lawrence | G10L 15/1815 |
| 2019/0164556 A1* | 5/2019 | Weber | G10L 15/26 |

* cited by examiner

INFORMATION PROCESSING SYSTEM, INFORMATION PROCESSING APPARATUS, AND COMPUTER READABLE RECORDING MEDIUM

The present application claims priority to and incorporates by reference the entire contents of Japanese Patent Application No. 2020-009449 filed in Japan on Jan. 23, 2020.

BACKGROUND

The present disclosure relates to an information processing system, an information processing apparatus, and a computer readable recording medium.

JP 2018-189984 A discloses a voice interaction method for using services of agents. The technique disclosed in JP 2018-189984 A determines which of agents should perform the process based on an input voice signal, based on a result of the voice recognition process and agent information.

Functions available in virtual personal assistant (VPA) services include services similar to each other provided by different VPA service providers. An example of this type of service includes a music provider service. The plurality of services similar to each other is each provided so as to function independently.

SUMMARY

A user of similar services receives the similar services provided independently of each other by different voice interaction agent providers. Therefore, even when services are similar with each other, it is necessary to give instructions independently for each of the voice interaction agents. In this case, for example, when the user first utters "Agent A, play a song", the song is started to be played by a voice interaction agent of the agent A provided by one predetermined provider. When the user subsequently utters "Agent B, play the next song", a voice interaction agent of the agent B provided by another provider may not recognize the previous song corresponding to "the next song", and therefore may not play the next song desired by the user. That is, since the service provided for each of voice interaction agents is independent of each other, it has been difficult to perform control that enables voice interaction agents to cooperate with each other even for similar services.

There is a need for an information processing system, an information processing apparatus, and a computer readable recording medium that are able to perform control that enables similar services provided by voice interaction agents to cooperate with each other.

According to one aspect of the present disclosure, there is provided an information processing system including: a first device including a first processor including hardware, the first processor being configured to acquire a user's uttered voice, transfer the user's uttered voice to at least one of a second device and a third device each of which actualizing a voice interaction agent, when a control command is acquired from a destination of the transfer, convert a control signal based on the acquired control command to a control signal that matches the second device, and transmit the converted control signal to the second device; a second device including a second processor including hardware, the second processor being configured to recognize the uttered voice transferred from the first device, and output, to the first device, a control command regarding a recognition result obtained by recognizing the uttered voice and response data based on the control signal acquired from the first device; and a third device including a third processor including hardware, the third processor being configured to recognize the uttered voice transferred from the first device, and output, to the first device, a control command regarding a recognition result obtained by recognizing the uttered voice.

DETAILED DESCRIPTION

Hereinafter, an embodiment of the present disclosure will be described with reference to the drawings. Note that the same or corresponding portions are denoted by the same reference signs throughout the drawings of an embodiment. Furthermore, the present disclosure is not limited by an embodiment described below.

Figure 1:
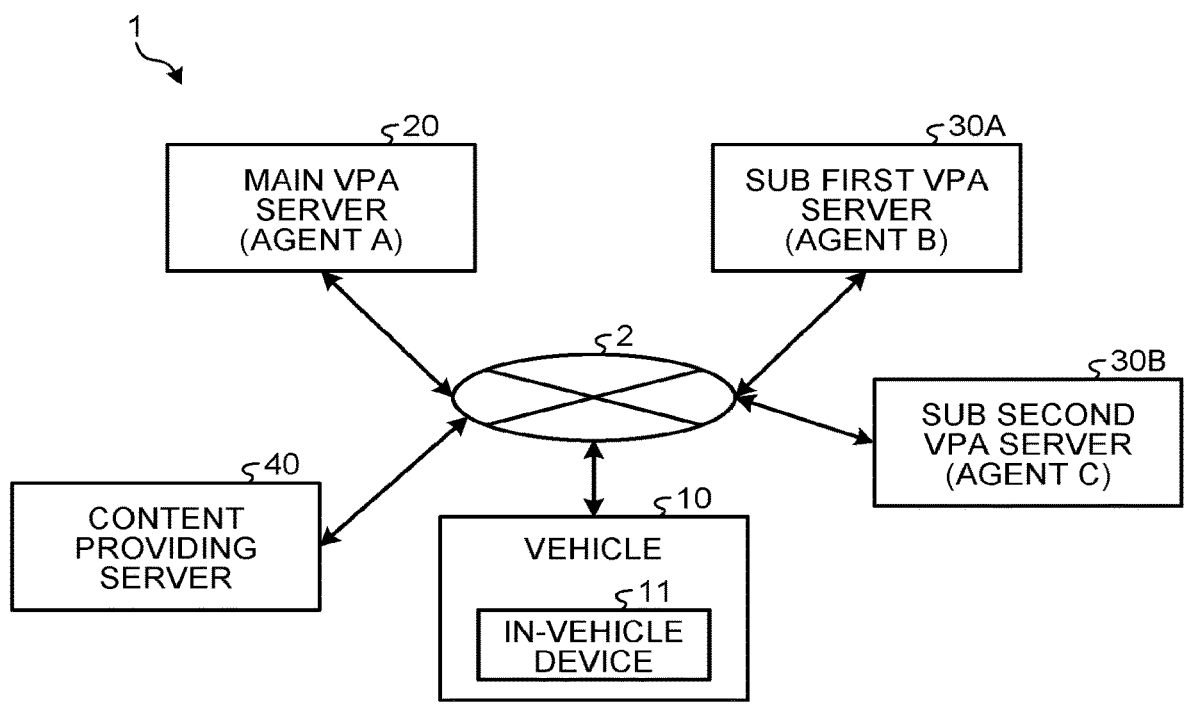
FIG. 1 is a block diagram schematically illustrating an agent system according to an embodiment.
Figure 2:
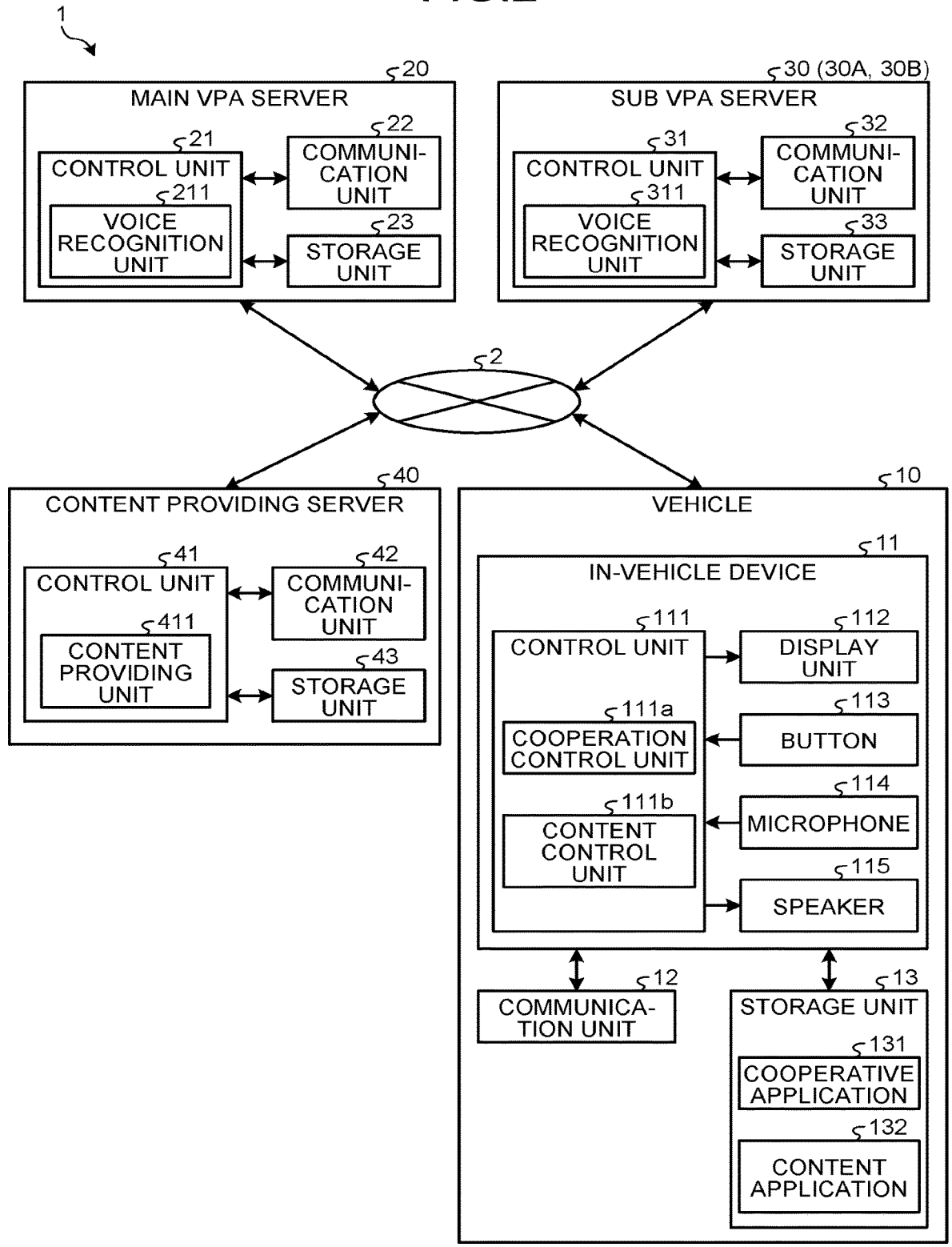
FIG. 2 is a block diagram schematically illustrating a configuration of an agent system according to an embodiment.

First, an agent system which is an information processing system, a terminal device which is an information processing apparatus, and a program executed in the agent system and the terminal device, according to an embodiment of the present disclosure, will be described. FIG. 1 is a block diagram illustrating an agent system 1. FIG. 2 is a block diagram schematically illustrating a configuration of various servers included in the agent system 1 and a terminal device as an information processing apparatus. The agent system and the terminal device according to the present embodiment provide services of voice interaction agents (hereinafter, agents) to a user. In addition, the components in the following embodiments include those that may be easily replaced by those skilled in the art, or those that are substantially the same.

Here, the terminal device according to the present embodiment is assumed as an in-vehicle device mounted on a vehicle, for example. A "user" is a person who uses services of agents through a terminal device, representing an occupant including a driver of a vehicle, for example. The terminal device is not limited to the in-vehicle device mounted on the vehicle, and may be an information terminal device carried by the user, for example. Examples of the information terminal device include a mobile phone, a tablet terminal, a wearable computer, and a personal computer.

As illustrated in FIG. 1, the agent system 1 according to an embodiment includes a vehicle 10 including an in-vehicle device 11, a main virtual personal assistant (VPA) server 20, a sub first VPA server 30A, a sub second VPA server 30B, and a content providing server 40. The terminal device according to the present embodiment is specifically actualized by the in-vehicle device 11. The vehicle 10, the main VPA server 20, the sub first VPA server 30A, and the sub second VPA server 30B are communicably connected with each other through a network 2. The network 2 includes an internet line network, a mobile phone line network, for example.

Although the agent system 1 in the present embodiment uses three VPA servers, the number of VPA servers may be four or more. In the present embodiment, the main VPA server 20 is a server device for actualizing the agent A. The sub first VPA server 30A is a server device for actualizing agent B, while the sub second VPA server 30B is a server device for actualizing agent C. The agents A, B, and C each provide the same service, such as a music distribution service. Note that the agents A, B, and C may be providers of mutually different services. Specifically, for example, the agents A and B may provide a music distribution service and the agent C may provide a weather information distribution service. In the present embodiment, the agents A, B, and C are collectively referred to as "agent". The sub first VPA server 30A and the sub second VPA server 30B are collectively referred to as the "sub VPA server 30". The main VPA server 20, the sub first VPA server 30A, and the sub second VPA server 30B are collectively referred to as the "VPA server" or the "agent server".

As illustrated in FIG. 2, the vehicle 10 includes the in-vehicle device 11, a communication unit 12, and a storage unit 13. Examples of the in-vehicle device 11 include a car navigator mounted on the vehicle 10 and a mobile terminal owned by a user to function in cooperation with the vehicle 10. The in-vehicle device 11 as a first device includes a control unit 111, a display unit (display) 112, a button 113, a microphone 114, and a speaker 115.

The control unit 111 as a first processor having hardware is specifically equipped with: a processor such as a central processing unit (CPU), a digital signal processor (DSP), or a field-programmable gate array (FPGA); and a main storage unit such as random access memory (RAM) or read only memory (ROM). The storage unit 13 includes a storage medium selected from erasable programmable rom (EPROM), a hard disk drive (HDD), a removable medium, or the like. Examples of the removable medium includes: a universal serial bus (USB) flash drive; or a disc recording medium such as a compact disc (CD), a digital versatile disc (DVD), or a Blu-ray (registered trademark) disc (BD). The storage unit 13 may store an operating system (OS), various programs, various tables, various databases, or the like. The control unit 111 loads a program stored in the storage unit 13, here, a cooperative application 131 or a content application 132, into a work area of the main storage unit and executes the program, controlling individual components or the like through the execution of the program. With this control, the control unit 111 enables the functions of a cooperation control unit 111*a* and a content control unit 111*b* that match a predetermined purpose.

The cooperation control unit 111*a* may include a voice recognition engine that performs automatic speech recognition (ASR) processing and natural language understanding (NLU). The cooperation control unit 111*a* converts the uttered voice of the user (user's uttered voice) into text data and determines that the utterance is an instruction directed to an agent in a case where the text data includes a phrase specifying the agent. Here, the "phrase specifying the agent" indicates a wake word (WW) for calling the agent.

The cooperation control unit 111*a* recognizes the user's uttered voice input from the microphone 114 and determines the VPA server 20, 30A, or 30B that transmits and receives information. That is, the cooperation control unit 111*a* determines to which of the plurality of agents A, B, or C the instruction included in the user's uttered voice is directed. The cooperation control unit 111*a* may display, on the display unit 112, the name of the determined agent when the unit has determined to which of the plurality of agents A, B, or C the instruction included in the uttered voice of the user is directed. This makes it possible to confirm to which agent the user has performed instruction.

The cooperation control unit 111*a* transfers the user's uttered voice to the agent server that actualizes the determined agent, namely, the main VPA server 20, the sub first VPA server 30A, or the sub second VPA server 30B, as a transfer destination. The predetermined information output from the agent server, for example, recognition result information may be acquired by the cooperation control unit 111*a*; and response data such as content data may be acquired by the content control unit 111*b*. Here, the content may be a movie, music, theatrical plays, literary arts, photographs, cartoons, animations, computer games and other characters, figures, colors, voices, motions or images, or a combination of these or information related to these, which may be provided via an information processing apparatus. The content may be one produced by human creative activities and belonging to the scope of education or entertainment.

In a case where the cooperation control unit 111*a* has no voice recognition engine, automatic voice recognition and natural language understanding may be performed by the main VPA server 20 or the sub VPA server 30. That is, the cooperation control unit 111*a* transmits the user's uttered voice input from the microphone 114 to individual VPA server 20, 30A, or 30B. Response may be performed by one or more VPA servers out of the VPA servers 20, 30A, or 30B, which actualizes a specific agent included in the wake word of the user's uttered voice.

The cooperation control unit 111*a* converts the recognition result or control command received from the determined VPA server 20, 30A, or 30B into a recognition result or a control signal that matches a predetermined agent, for example, the main VPA server 20 actualizing the agent A. Specifically, for example, the cooperation control unit 111*a* converts control commands specific to the agents output from the sub VPA servers 30 of the agents B and C, into a control signal that matches the main VPA server 20 that actualizes the agent A.

The content control unit 111*b* controls the content to be displayed on the display unit 112 or the content to be output from the speaker 115 based on a control command received from the main VPA server 20. Specifically, the content control unit 111*b* controls the display unit 112 particularly to display the predetermined information input from the main VPA server 20. Examples of the "predetermined information" include, but are not limited to, a recognition result of the user's uttered voice, response data regarding processing based on user's instruction, or the like. An example of the "processing based on user's instruction" is a process performed when the user has instructed the agent (VPA server) to "play music". The process is performed by the VPA server and corresponds to the process of acquiring music data from the content providing server 40 and transmitting the acquired data to the in-vehicle device 11. In this case, the "response data" transmitted from the main VPA server 20 to the in-vehicle device 11 is content data such as music data. The content data is not limited to music data, and may be various data that may be output from the display unit 112 or the speaker 115, such as predetermined display data and video data. The content control unit 111*b* may control to display a screen corresponding to user's operation on the display unit 112 based on the user's operation. The content control unit 111*b* may perform control such that the content data received from the content providing server 40 is displayed on the display unit 112 or output from the speaker 115.

The cooperation control unit 111*a* may output the result of voice recognition process to the agent server (main VPA server 20 or sub first VPA server 30A) as it is. In this case, the content control unit 111b may output the recognition result of the user's uttered voice instead of the user's uttered voice, to the agent server. Next, the content control unit 111b acquires predetermined information (response data or the like) from the agent server. This makes it possible to omit the voice recognition process in the agent server, leading to improvement of the response speed of the agent server.

The display unit 112 includes a liquid crystal display (LCD), an organic EL display (OLED), or the like, for example, and displays information under the control of the content control unit 111b. The button 113 is a button that the user presses at utterance. The button 113 is formed with a push-type physical push button provided on a steering wheel of the vehicle 10, or the like, or a virtual push button displayed on the display unit 112.

Here, the agent in the present embodiment has calling methods (starting methods). For example, when instructing the agent B (sub first VPA server 30A) to provide weather information, the user utters as in the following Methods (1) and (2).

(1) Utterance: "Agent B, tell me the weather today".
(2) Utterance: "Tell me the weather today" while pressing the part of the button 113 corresponding to the agent B.

Here, pressing and uttering may include a case of uttering after pressing/releasing the button 113, or a case of uttering while keeping the button 113 pressed and releasing the button 113 after completion of the utterance.

Method (1) is a method using a wake word, in which the user utters a phrase including a phrase specifying the agent B and a phase as an instruction directed to the agent B. Method (2) is a method in which the button 113 is used instead of the wake word. In this manner, by pressing the button 113 and then uttering, the wake word may be omitted.

The microphone 114 is an input unit that receives voice input from the user. The microphone 114 is used when the user gives an instruction to the agent (VPA server), for example. The speaker 115 is an output unit that outputs voice and music. The speaker 115 is used when the agent responds to the user based on the user's instruction, for example.

The communication unit 12 includes a data communication module (DCM), for example, and communicates with the main VPA server 20, the sub first VPA server 30A, and the sub second VPA server 30B by wireless communication via the network 2.

The main VPA server 20, defined as a second device or a main server, includes a control unit 21, a communication unit 22, and a storage unit 23. The control unit 21, the communication unit 22, and the storage unit 23 are physically similar to the control unit 111, the communication unit 12, and the storage unit 13 described above, respectively.

The control unit 21 as a second processor having hardware functions as a voice recognition unit 211 through execution of the program stored in the storage unit 23. The voice recognition unit 211 has functions similar to the cooperation control unit 111a, recognizes the user's uttered voice transferred from the in-vehicle device 11, outputs predetermined information (recognition result information, response data), and transmits the information to the in-vehicle device 11.

The voice recognition unit 211 may store the content of the interaction with the user in the storage unit 23 as user's preference information, and may perform processing in consideration of the user's preference information when performing the processing based on the recognition result of the user's uttered voice transferred from the in-vehicle device 11. For example, when the user frequently instructs the agent A to play music of a specific genre (for example, classical music), the voice recognition unit 211 stores information "user's favorite music genre: classical music" as preference information, in the storage unit 23. Subsequently, when the user instructs the agent A to "play music", the voice recognition unit 211 acquires classical music data from the service server such as the content providing server 40 and transmits the data to the in-vehicle device 11. This makes it possible to receive a service that fits user's preference, which improves convenience.

The storage unit 23 stores as necessary data of the content of the user interaction, data of the recognition result of the user's uttered voice, or the like, for example. Note that these pieces of information may be deleted from the storage unit 23 after use from the viewpoint of privacy protection.

The sub VPA server 30 (sub first VPA server 30A and sub second VPA server 30B) as a third device or a sub server includes a control unit 31, a communication unit 32, and a storage unit 33. The control unit 31, the communication unit 32, and the storage unit 33 are physically similar to the control unit 111, the communication unit 12, and the storage unit 13 described above, respectively. The control unit 31 as a third processor having hardware functions as a voice recognition unit 311 through execution of the program stored in the storage unit 33.

The voice recognition unit 311 has functions similar to the cooperation control unit 111a, recognizes the user's uttered voice transferred from the in-vehicle device 11, outputs predetermined information (recognition result information, response data), and transmits the information to the in-vehicle device 11. Similarly to the voice recognition unit 211, the voice recognition unit 311 may store the content of the interaction with the user in the storage unit 33 as user's preference information, and may perform processing in consideration of the user's preference information when performing processing based on the recognition result of the user's uttered voice transferred from the in-vehicle device 11. This makes it possible to receive a service that fits user's preference, which improves convenience.

The storage unit 33 stores, as necessary, information of the content of the user interaction, recognition result information of the user's uttered voice, or the like, for example. Note that these pieces of information may be deleted from the storage unit 33 after use from the viewpoint of privacy protection.

The content providing server 40 as a fourth device includes a control unit 41, a communication unit 42, and a storage unit 43. The control unit 41, the communication unit 42, and the storage unit 43 are physically similar to the control unit 111, the communication unit 12, and the storage unit 13 described above, respectively.

The control unit 41 as a fourth processor having hardware functions as a content providing unit 411 through execution of the program stored in the storage unit 43. The content providing unit 411 retrieves requested predetermined content information from the storage unit 43 based on a content control signal received from the outside, outputs the information, and transmits the information to the VPA servers 20, 30A, and 30B as content data. The content information may be transmitted from the content providing server 40 to the in-vehicle device 11.

Figure 3:
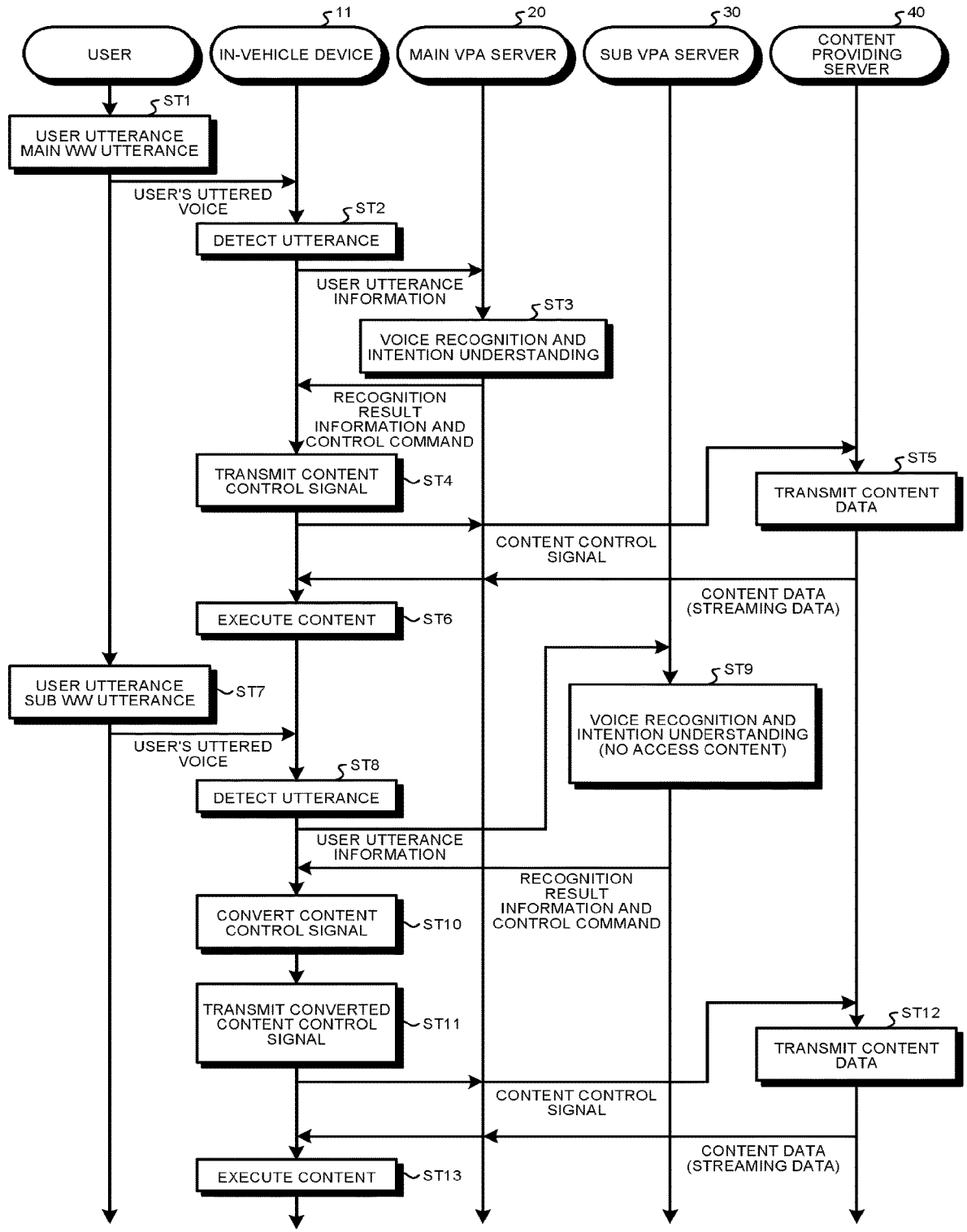
FIG. 3 is a flowchart illustrating an example of a voice interaction method executed by the information processing system and the information processing apparatus according to an embodiment by using a program.

A processing procedure of a voice interaction method in the agent system 1 according to the present embodiment will be described with reference to FIG. 3. The following describes a voice interaction method in a case where a user gives an instruction to a specific agent and then gives a related instruction to another agent.

First, the user utters, for example, "Agent A, play the song oo" (step ST1), and thereafter, data of the user's uttered voice is input through the microphone 114 of the in-vehicle device 11. The cooperation control unit 111a of the in-vehicle device 11 detects the user's utterance, performs a voice recognition process and an intention understanding process, determines that the instruction is directed to the agent A, and transmits user utterance information to the main VPA server 20 (step ST2). In a case where the cooperation control unit 111a has no voice recognition engine, the cooperation control unit 111a transfers the user's uttered voice input from the microphone 114 individually to the VPA servers 20, 30A, and 30B. In this case, the main VPA server 20 that actualizes "agent A" included in the wake word of the user's uttered voice executes the process based on the user's instruction.

Subsequently, the voice recognition unit 211 of the main VPA server 20 performs a voice recognition process and an intention understanding process, outputs recognition result information and a control command, and transmits the recognition result information and the control command to the in-vehicle device 11 (step ST3). The in-vehicle device 11 inputs the received recognition result information and the control command to the control unit 111. When the cooperation control unit 111a of the control unit 111 determines that the received recognition result information and the control command are data received from the main VPA server 20, the content control unit 111b transmits a content control signal that matches the main VPA server 20 (step ST4). The main VPA server 20 transfers the received content control signal to the content providing server 40.

After receiving the content control signal, the content providing unit 411 of the content providing server 40 retrieves requested predetermined content information from the storage unit 43 based on the content control signal and outputs the information. The content providing server 40 transmits the output content information as content data to the in-vehicle device 11 via the main VPA server 20 (step ST5). After receiving the content data, the content control unit 111b of the in-vehicle device 11 displays the content data on the display unit 112 and outputs the music data included in the content data from the speaker 115 so as to execute the content (step ST6). The content data may be transmitted as streaming data to the main VPA server 20 or the in-vehicle device 11.

Thereafter, when the user utters "Agent B, play next song" (step ST7), for example, data of the user's uttered voice is input through the microphone 114 of the in-vehicle device 11. The cooperation control unit 111a of the in-vehicle device 11 detects the user's utterance, performs the voice recognition process and the intention understanding process, determines that the instruction is directed to the agent B, and transmits the user utterance information to the sub first VPA server 30A (step ST8). Note that, FIG. 3 uses a collective description as the sub VPA server 30. In a case where the cooperation control unit 111a has no voice recognition engine, the cooperation control unit 111a transfers the user's uttered voice input from the microphone 114 individually to the VPA servers 20, 30A, and 30B. The sub first VPA server 30A that actualizes "agent B" included in the wake word of the user's uttered voice executes the process based on the user's instruction.

Subsequently, the voice recognition unit 311 of the sub first VPA server 30A performs the voice recognition process and the intention understanding process, outputs the recognition result information and a control command, and transmits the recognition result information and the control command to the in-vehicle device 11 (step ST9). The in-vehicle device 11 inputs the received recognition result information and the control command to the control unit 111. After determining that the received recognition result information and the control command are data received from the sub first VPA server 30A, the cooperation control unit 111a of the control unit 111 converts the received control command into a content control signal that matches the main VPA server 20 (step ST10).

The content control unit 111b transmits, to the main VPA server 20, the converted content control signal that matches the main VPA server 20 (step ST11). The main VPA server 20 transfers the received content control signal to the content providing server 40. Here, specifically, the information of the instruction "play the next song" of the above-described user's utterance has been converted into the information of the instruction directed to the main VPA server 20, for example. This enables the main VPA server 20 to transmit, to the content providing server 40, a content control signal to acquire content data of the music piece next to the "song oo".

After receiving the content control signal, the content providing unit 411 of the content providing server 40 retrieves requested predetermined content information such as content information regarding the next music piece, for example, from the storage unit 43 based on the content control signal and outputs the information. The content providing server 40 transmits the output content information as content data to the in-vehicle device 11 via the main VPA server 20 (step ST12). After receiving the content data, the content control unit 111b of the in-vehicle device 11 displays the content data on the display unit 112 and outputs the music data included in the content data from the speaker 115 so as to execute the content (step ST13). The content data may be transmitted as streaming data to the main VPA server 20 or the in-vehicle device 11.

According to an embodiment described above, the present disclosure is advantageous when a user uses agents, that is, a predetermined agent A actualized by the main VPA server 20 and other agents B and C actualized by the sub VPA server 30. That is, even when the user gives an instruction to the agent B or C, the instruction may be executed as a process instructing the predetermined agent A. Even in this case, the voice recognition process and the intention understanding process for the user's uttered voice are executed by the agent requested by the user, for example, the sub first VPA server 30A of the agent B. Therefore, there is no increase in the load on the main VPA server 20 that actualizes the predetermined agent A. Furthermore, even in a case where services similar to each other is provided by agents, the main VPA server 20 may integrally perform the content control process, enabling the user to cross-functionally use the plurality of agents A, B, and C, without feeling uncomfortable for the user.

In an embodiment described above, a program capable of executing the processing method using the in-vehicle device 11 or the main VPA server 20 may be recorded in a recording medium readable by a computer or other machines or devices (hereinafter, referred to as a computer or the like). Allowing the program recorded in this recording medium to be read and executed by the computer or the like enables the computer to function as the in-vehicle device 11 or the main VPA server 20. Here, the recording medium that may be read by a computer or the like means a non-transitory medium that stores information such as data and programs by electrical, magnetic, optical, mechanical, or chemical action so as to be read from the computer or the like. Among such recording media, examples of media removable from the computer or the like include: a flexible disk, a magneto-optical disk, a CD-ROM disc, a CD-R/W, a digital versatile disk (DVD), a BD, a DAT, a magnetic tape, and a memory drive such as a flash drive. In addition, examples of recording media build into the computer or the like include a hard disk and a ROM device. Furthermore, SSD may be used as a recording medium removable from a computer or the like, or as a recording medium build into the computer or the like.

While an embodiment of the present disclosure has been specifically described above, the present disclosure is not limited to the above-described embodiment, and it is possible to achieve various modifications based on the technical ideas of the present disclosure. The scope of the present disclosure is not limited to these descriptions, and should be broadly construed based on the claims. For example, the numerical values in an embodiment described above are merely examples, and it is allowable to use numerical values different from these as needed. In addition, various alterations and modifications based on these descriptions are also included in the scope of the present disclosure.

For example, in an embodiment described above, in a case where the user gives an instruction to execute the content such as "play music", the VPA server 20, 30A, or 30B acquires content data from the content providing server 40 and transmits the acquired content data to the in-vehicle device 11. Alternatively, the VPA servers 20, 30A, or 30B may control the content providing server 40 so as to cause the content providing server 40 to directly transmit the content data such as music data to the in-vehicle device 11.

Furthermore, in the information processing apparatus, the information processing server, and the vehicle according to an embodiment, the above-described "unit" is interchangeable with a "circuit" or the like. For example, the communication unit is interchangeable with a communication circuit.

Furthermore, the program to be executed by the information processing apparatus according to an embodiment may be stored on a computer connected to a network such as the Internet so as to be downloaded via the network to be provided.

In the description of the flowcharts in the present specification, although the expressions "first", "next", "subsequently", or the like are used to clarify a processing order of the steps, the processing order required to carry out the present embodiments shall not be defined uniquely by these expressions. That is, the processing order in each of the flowcharts described in the present specification may be changed unless it is inconsistent.

According to the present disclosure, it is possible to perform control that enables similar services provided by voice interaction agents to cooperate with each other.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
an information processing device including a first processor;
a main server including a second processor;
a sub server including a third processor; and
a content providing server, including a fourth processor, that outputs a content information as content data;
wherein the information processing device is configured to, when a user utters, detect the user's uttered voice as user utterance information, perform a recognition of user's uttered voice, understand an intention of the user, determine to which of the main server or the sub server or both of the main server and the sub server the user is directed to instruct based on the user's uttered voice, transmit the user utterance information to at least one of the main server or the sub server, the main server is configured to, when receiving the user utterance information, perform a recognition of the user and an intention understanding of the user based on the transmitted user utterance information, and transmit information indicating the recognition result and a control command to the information processing device, the information processing device is configured to, when determining that the information indicating the recognition result and the control command are transmitted from the main server, transmit a content control signal that matches the main server to the main server, the content control signal being to be further transmitted to the content providing server from the main server so that the content providing server outputs content data, based on the content control signal, to the information processing device via the main server, the sub server is configured to, when receiving the user utterance information, perform a recognition of the user and an intention understanding of the user based on the transmitted user utterance information, and transmit information indicating the recognition result and a control command to the information processing device, and the information processing device is configured to, when determining that the information indicating the recognition result and the control command are transmitted from the sub server, transmit a content control signal that matches the main server to the main server, the content control signal being to be further transmitted to the content providing server from the main server so that the content providing server outputs content data, based on the based on the content control signal, to the information processing device via the main server.

2. The information processing system according to claim 1, wherein
the second processor is configured to determine whether a voice interaction agent included in the user's uttered voice is to be actualized by the main server,
the third processor is configured to determine whether the voice interaction agent included in the user's uttered voice is to be actualized by the sub server, and
one of the second processor and the third processor that determines that the voice interaction agent is to be actualized by the main server or the sub server, respectively,
transmits the information indicating the recognition result and the control command to the information processing device.

3. The information processing system according to claim 1, wherein
the first processor is configured to output a result of recognizing the user's uttered voice instead of the user's uttered voice to at least one of the main server or the sub server, and
the second processor or the third processor is configured to perform a process based on the result of recognizing the user's uttered voice transferred from the information processing device, and output the control command to the information processing device.

4. An information processing apparatus comprising:
a processor comprising hardware, the processor being configured to:
   when a user utters, detect the user's uttered voice as user utterance information, perform a recognition of user's uttered voice;
   understand an intention of the user;
   determine to which of a main server or a sub server or both of the main server and the sub server the user is directed to instruct based on the user's uttered voice;
   transmit the user utterance information to at least one of the main server or the sub server,
wherein the main server is configured to, when receiving the user utterance information, perform a recognition of the user and an intention understanding of the user based on the transmitted user utterance information, and transmit information indicating the recognition result and a control command to the information processing apparatus,
wherein the processor is further configured to, when determining that the information indicating the recognition result and the control command are transmitted from the main server, transmit a content control signal that matches the main server to the main server, the content control signal being to be further transmitted to a content providing server from the main server so that the content providing server outputs content data, based on the content control signal, to the information processing apparatus via the main server,
wherein the sub server is configured to, when receiving the user utterance information, perform a recognition of the user and an intention understanding of the user based on the transmitted user utterance information, and transmit information indicating the recognition result and a control command to the information processing apparatus, and
wherein the processor is further configured to, when determining that the information indicating the recognition result and the control command are transmitted from the sub server, transmit a content control signal that matches the main server to the main server, the content control signal being to be further transmitted to the content providing server from the main server so that the content providing server outputs content data, based on the based on the content control signal, to the information processing apparatus via the main server.

5. A non-transitory computer-readable medium storing instructions that, when executed by one or more processors of an information processing device, cause the information processing device to:
   when a user utters, detect the user's uttered voice as user utterance information, perform a recognition of user's uttered voice;
   understand an intention of the user;
   determine to which of a main server or a sub server or both of the main server and the sub server the user is directed to instruct based on the user's uttered voice;
   transmit the user utterance information to at least one of the main server or the sub server,
wherein the main server is configured to, when receiving the user utterance information, perform a recognition of the user and an intention understanding of the user based on the transmitted user utterance information, and transmit information indicating the recognition result and a control command to the information processing device,
wherein the instructions further cause the information processing device to, when determining that the information indicating the recognition result and the control command are transmitted from the main server, transmit a content control signal that matches the main server to the main server, the content control signal being to be further transmitted to a content providing server from the main server so that the content providing server outputs content data, based on the content control signal, to the information processing device via the main server,
wherein the sub server is configured to, when receiving the user utterance information, perform a recognition of the user and an intention understanding of the user based on the transmitted user utterance information, and transmit information indicating the recognition result and a control command to the information processing device, and
wherein the instructions further cause the information processing device to, when determining that the information indicating the recognition result and the control command are transmitted from the sub server, transmit a content control signal that matches the main server to the main server, the content control signal being to be further transmitted to the content providing server from the main server so that the content providing server outputs content data, based on the based on the content control signal, to the information processing device via the main server.

* * * * *